United States Patent [19]

Nelson

[11] Patent Number: 5,784,794
[45] Date of Patent: Jul. 28, 1998

[54] SENSING DEVICE

[76] Inventor: Donald Fredrick Nelson, 305 - 4311 - 73rd St. NW. Calgary, Alberta, Canada, T3B 2M2

[21] Appl. No.: 520,146

[22] Filed: Aug. 28, 1995

Related U.S. Application Data

[63] Continuation-in-part of Ser. No. 148,458, Nov. 8, 1993, Pat. No. 5,444,917.

[51] Int. Cl.$^6$ .................................................. G01C 9/06
[52] U.S. Cl. .................................. 33/366; 33/382; 33/395
[58] Field of Search ........................... 33/366, 381, 382, 33/389, 390, 391, 395, 383

[56] References Cited

U.S. PATENT DOCUMENTS

| 1,012,668 | 12/1911 | Lofberg | 33/383 |
|---|---|---|---|
| 1,298,844 | 4/1919 | Wichertjes | 33/383 |
| 2,338,811 | 1/1944 | Hasbrook | 33/366 |
| 2,825,144 | 3/1958 | Warden, Sr. et al. | 33/383 |
| 2,893,134 | 7/1959 | Shea et al. | 33/366 |
| 3,271,650 | 9/1966 | Riddle | 33/366 |
| 3,354,554 | 11/1967 | Panerai et al. | 33/366 |
| 4,325,190 | 4/1982 | Duerst | 33/366 |
| 4,603,484 | 8/1986 | Strothmann | 33/366 |
| 5,042,158 | 8/1991 | Schmelzer | 33/366 |
| 5,136,784 | 8/1992 | Marantz | 33/366 |
| 5,177,872 | 1/1993 | Lewis et al. | 33/366 |
| 5,444,917 | 8/1995 | Nelson | 33/366 |

*Primary Examiner*—Christopher W. Fulton

[57] ABSTRACT

A computer input device. The device is a body containing at least one tube. There is a first conductor in the tube able to move along the tube. Spaced contacts are formed within the tube and conductors extend from the spaced contacts. First interfaces receive information from the conductors as to the position of the first conductor in the tube and input information to the computer based on the position of the first conductor. Second interfaces input information to the computer.

7 Claims, 8 Drawing Sheets

5,784,794

1

SENSING DEVICE

CROSS-REFERENCE TO RELATED APPLICATION

This application is a continuation-in-part of application Ser. No. 08/148,458, filed Nov. 8, 1993, now U.S. Pat. No. 5,444,917, issued Aug. 29, 1995, the subject matter of which is incorporated herein by reference.

FIELD OF THE INVENTION

This invention relates to a sensing device. The invention finds particular application as a wire or wireless level and tilting device for mouse or joy-stick computer control and other remote controls.

DESCRIPTION OF THE PRIOR ART

Traditionally a level, for example in construction, has been determined by the use of a spirit level. A spirit level includes a glass tube filled with a coloured liquid having a bubble in it. There is a flat surface.

The arrangement is such that if the flat surface is placed against a surface that is level, then the bubble aligns with a calibrated mark on the spirit level. These spirit levels are useful in determining either true vertical or true horizontal. The traditional remote controls, whether wire or wireless, use a ball or some type of stick. This prior art is either cumbersome or fragile.

However, there are circumstances where a remote sensing of level or remote control is desirable and, clearly, a conventional spirit level is not suitable in those circumstances as an observation of the bubble must be made. Remote observation or remote operation of equipment is desirable where, for example, there is a toxic environment, where it is dark, or, perhaps more usually, where the level can be adjusted, for example by use of a hydraulic jack, but the position of adjustment is remote from the surface being levelled, for example, a trailer being levelled from the cab of a vehicle.

There are a number of electrical and mechanical devices useful in determining levels that are more sophisticated then the bubble spirit level. Examples of these level include those described and claimed in U.S. Pat. Nos. 4,912,854 to Weadon; 5,031,329 to Smallidge; 4,716,534 to Baucom; 4,760, 646 to Preston; 4,486,844 to Brunson and 4,503,622 to Swartz.

Of the above patents Weadon discloses an apparatus for facilitating the reading of a conventional level, that is a level using a bubble. Weadon uses a viewing chamber. Smallidge uses bladders and senses differing electrical resistance.

Baucom uses a micro-processor and a photo-detector. Preston uses a pendulum. Brunson is a sophisticated, expensive piece of equipment using a dual axis sensor element. Swartz uses a sensor and reads a differential signal that is developed across contacts. The amplitude and phase of these signals are determined by the tilt angle.

The above devices vary between the very simple and the very complex. But it is felt that there is still a need for an electrically operated sensor to determine a level or conversely, a tilt, particularly remotely, by wire or wireless, and at night, that is robust and simple. Excessive sophistication is not required in this field.

SUMMARY OF THE INVENTION

Accordingly the present invention provides a computer input device comprising a body containing a tube; a first

2 conductor in the tube able to move along the tube; a plurality of spaced contacts within the tube; conductors extending from the spaced contacts; first interface means to receive information from said conductors as to the position of the first conductor in the tube and input information to the computer based on the position of the first conductor and second interface means to input information to the computer.

The shape of the tube may be arcuate or any shape that provides a desired response to movement of the first conductor.

The first conductor may be a liquid, preferably mercury.

The input device preferably includes at least one depressible switch, which may be remote, to input information to the computer.

DESCRIPTION OF THE DRAWINGS

The invention is illustrated, merely by way of example, in the drawings, in which.

DESCRIPTION OF THE PREFERRED EMBODIMENTS

Figure 1:
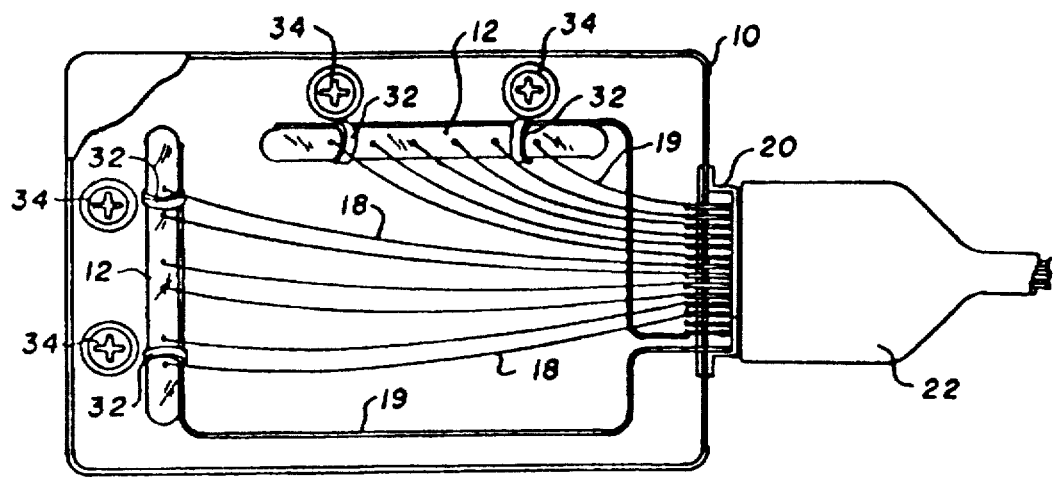
FIG. 1 is a plan view, partially in section, of a sensing device according to the present invention.
Figure 2:
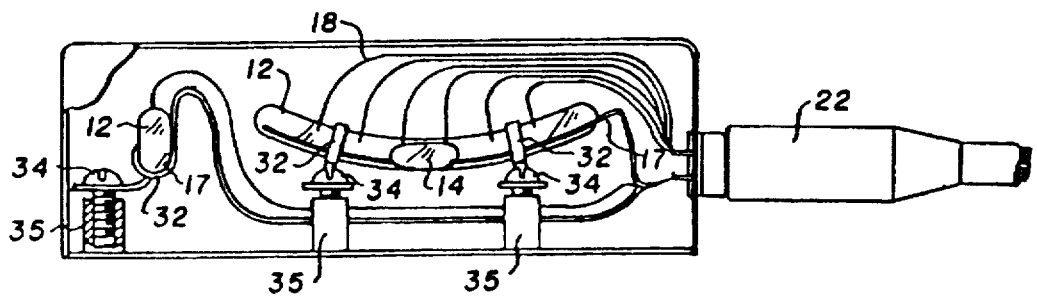
FIG. 2 is a side elevation of the sensing device of FIG. 1.
Figure 3:
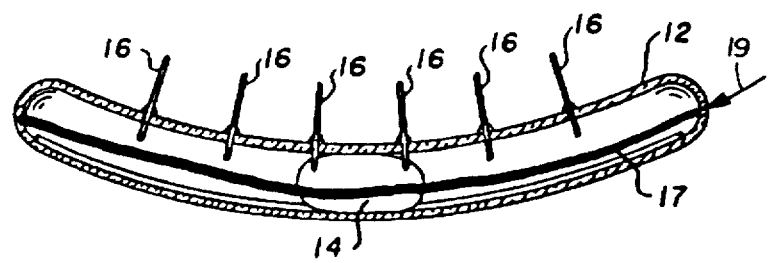
FIG. 3 is a detail of the device of FIGS. 1 and 2.

FIGS. 1 to 3 show a sensing device comprising a body 10 containing an arcuate tube 12. As shown particularly in FIGS. 2 and 3, there is a conducting liquid 14 in the tube 12. Mercury is preferred. FIG. 1 in particular shows the use of two arcuate tubes 12 so that the sensing device can be used to determine level in two planes.

Figure 4:
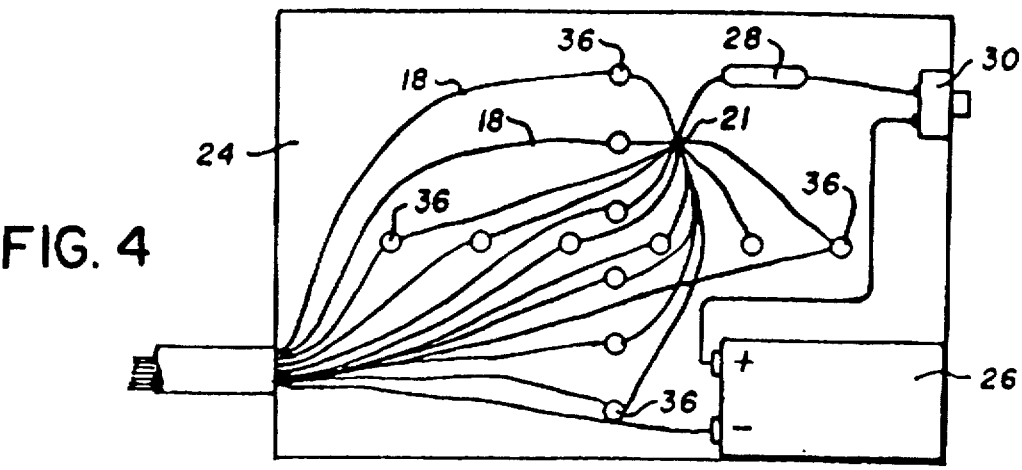
FIG. 4 illustrates a remote read-out useful, for example, with the sensing device of FIG. 1.

As shown particularly in FIG. 3, there is a plurality of spaced contacts 16 and one common probe 17 within the tube. Conductors 18 extend from the spaced contacts 16 as shown most clearly in FIGS. 1 and 2. In the embodiment of FIGS. 1 to 3 the spaced contacts 16 are probes extending through the tube 12 and FIG. 1 shows that the wires extend to a socket 20 mounted in the body 10. A lead 22 extends from the socket 20 to a remote read-out, for example the remote read-out 24 as shown in FIG. 4. In FIG. 1 the sockets 22 may be replaced with a multi-band transmitter/receiver. In the remote read-out 24 there is a power source 26, typically a nine volt battery, and a resistor 28. The resistor 28 is in series with the wiring 21 and with a switch 30. The resistor 28 is on the positive side of the LEDs and wires 18 are on the negative side of the LEDs. Probe 17 is from the nine volt negative contact with the mercury and when the mercury contacts probes 16 the mercury sensor conducts the negative to the negative side of the LEDs. The positive power of the nine volt battery goes through resistor 28 and joins all the positive wires from the positive side of the LEDs at 21. The above arrangements of positive and negative poles may be reversed.

As shown in FIG. 1 to 3, there is a common probe 17 in the tube 12, opposed to probes 16. The common probe 17 can extend inside the tube from one end of the tube to the other end or can be individual probes to pair with probes 16. The probes 16 and common probe 17 may each be in contact with the negative pole of battery 26. Common probe 17 is in direct contact with a negative pole of the battery 26 but probes 16 only are in contact when the mercury completes the circuit by coming into contact with probe 16. Common probe 17 contacts through negative wire 19. The circuit includes resistor 28 in series with switch 30. Wires 18 are in contact with the negative side of the LEDs and resistor 28 and common meeting place 21 join to the positive side of the LEDs.

FIG. 1 also shows the use of a levelling system comprising brackets 32 attached to each tube 12 and mounted on screws 34 received in housings 35. Thus minor adjustments to the level can be made by rotating the screws 34 to move the bracket 32 up and down to make minor adjustments in the calibration of the level.

There are series of light emitting diodes 36 (LED) mounted in the remote read-out 24. The LEDs 36 are arranged in a cross, as shown particularly in FIG. 4 but altering the sensors by 45° will allow for an X which will then show each corner of the body being level, instead of merely the front, back and sides. Level is achieved by lighting four LEDs at the middle of the read-out, indicating level in two planes. Alternatively only one LED in the centre may be illuminated.

Thus to use the level of FIGS. 1 to 4, the body 10 containing the arcuate tubes 12 is placed on the surface to be assessed. Depending on the length of the lead 22, or the power of the wireless, the remote read-out 24 may be positioned wherever it is desired to be read. This can be at a substantial distance from the body 10. The switch 30 is switched on to operate the device and the level of the surface receiving the body assessed. It should be noted that out of true can also be assessed by viewing the LEDs that are illuminated. If necessary remote levelling can be carried out, for example by the use of a hydraulic or pneumatic circuit.

Figure 5:
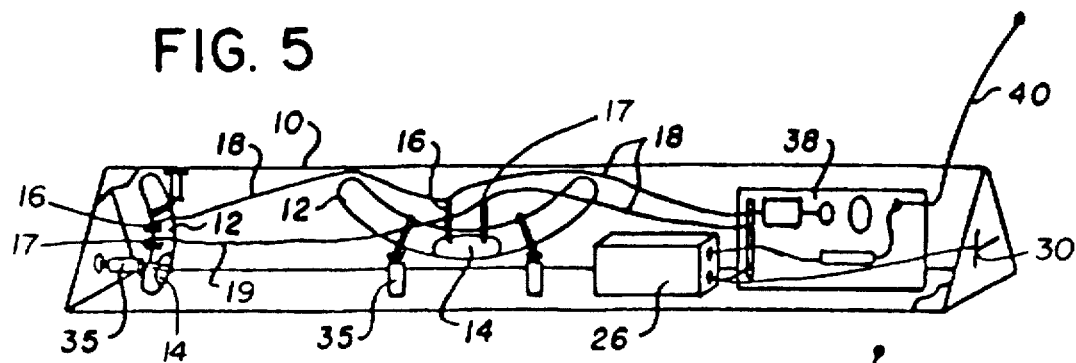
FIG. 5 illustrates a level according to a further aspect of the present invention.
Figure 6:
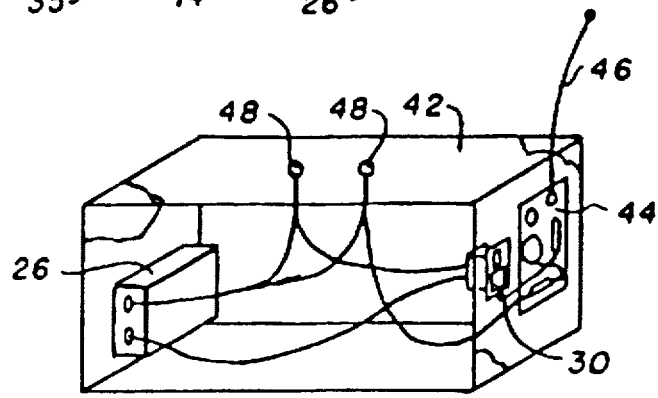
FIG. 6 illustrates a read-out useful with the sensing device of FIG. 5.

FIGS. 5 and 6 illustrate an embodiment in which the tubes are mounted in a generally triangular body although the shape of the body is immaterial. Other components in FIG. 5 are as in previous drawings and the same reference numerals are used as in those previous drawings. Instead of common probe 17, individual probes 17 are used in conjunction with each probe 16. There is an on/off transmitter 38 having an antenna 40. A receiver body 42 is shown in FIG. 6. It includes a signal receiver 44 with antenna 46. Receiver body 42 and transmitter body 10 each have a 9 volt battery 26 and a switch 30. This device is operated precisely as the embodiment of FIGS. 1 to 4 except that the lead 22 is superfluous. A signal is transmitted from the antenna 40 and is received by the antenna 46 of the remote read-out 42. By known means LEDs 48 are illuminated when level is achieved. The one set of probes 16 and one single conductor wire 18 are joined and one set of probes 17 are joined to one single conductor wire 19. Only one sensor works at one time. The mercury in the non-working sensor is moved to the end of the arcuate tube, away from the probes 16 and 17.

If a multi-band transmitter/receiver is used then other lights can indicate graduating angles of level as in FIGS. 1 and 2. One LED 48 is, in this simple version, on when out of level. For example that may be red. When level is achieved the red LED will go out and another LED, for example green, will come on.

Figure 7:
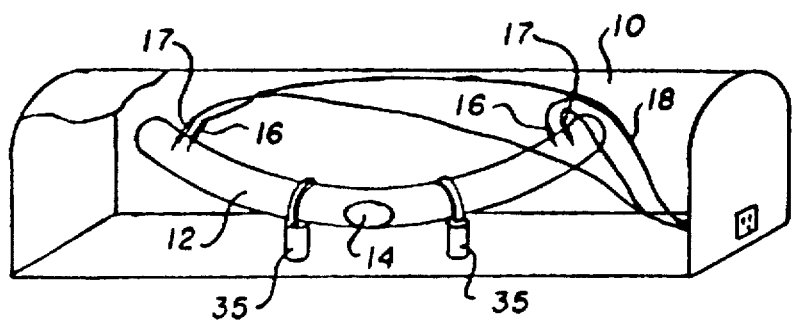
FIG. 7 illustrates a further embodiment of the invention.

FIGS. 7 shows an embodiment that can be used as an angle indicator. FIG. 7 again has a body 10 containing a tube 12. There is a plurality of contacts 16, as in FIG. 1, but, unlike FIG. 1, the contacts 16 are relatively far apart and each contact 16 has an associated common probe 17. The arrangement is such that the embodiment of FIG. 7 can determine when an inclination reaches, for example, a certain critical angle. At that stage an alarm can be sounded or a light flashed to warn the user that the angle has been reached. Any appropriate type of alarm or circuit switch (on or off) may be used.

The embodiment of FIG. 7 is particularly useful in, for example, trucks, where shifting of the load can be determined. It is also useful in farm tractors, cranes, trains and the like to determine excessive lean or sway.

Figure 8:
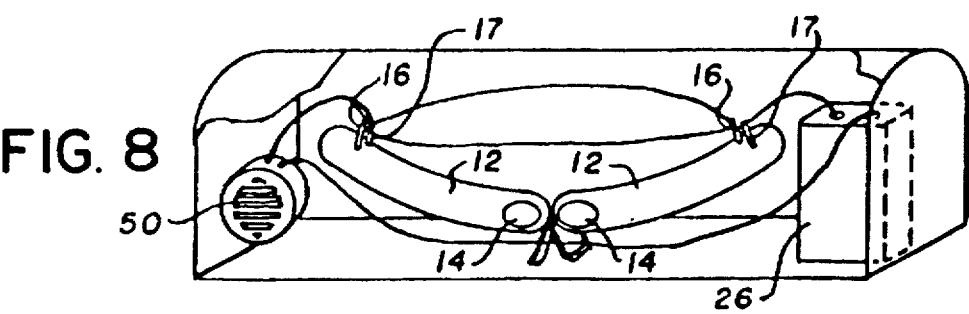
FIG. 8 illustrates a variation of FIG. 7.

FIG. 8 shows the use of two independent adjustable angle tubes 12. Again the contacts 16 and probe 17 are widely spaced and again the intention is to be able to determine when a certain lean is reached. A buzzer 50 is shown as an alarm.

The embodiment of FIGS. 7 and 8 can be modified to incorporate a cut-out or a circuit (on or off). Further contact 16 and probes 17 are put in tube 12. The arrangement is such that with a first inclination an alarm sounds but with a second, greater inclination a further safety activity is carried out. For example the motor of a farm tractor or the like is switched off automatically or pumps, motors, contact breakers and the like may be switched on.

Figure 9:
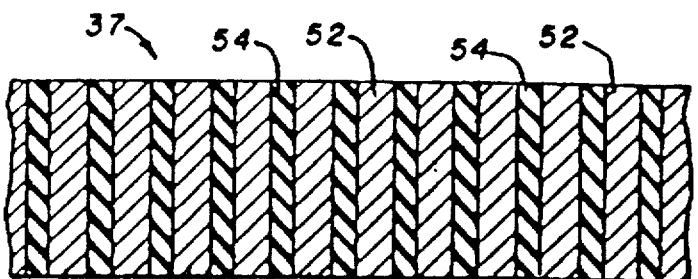
FIG. 9 illustrates an alternative contact system for the sensing device of the present invention.
Figure 9A:
FIG. 9A is a rear view of the contact system of FIG. 9.
Figure 10:
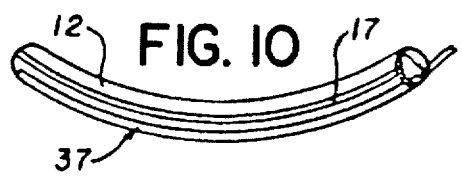
FIGS. 10, 10A and 10B illustrate locations for the contacts of FIGS. 9 and 9A.
Figure 10A:
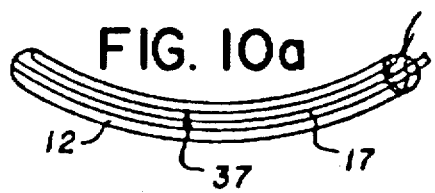
Figure 10B:
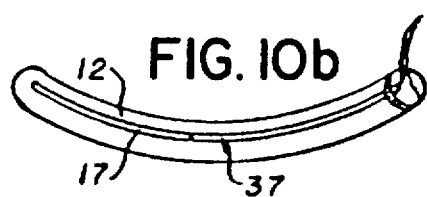

FIGS. 9 through 10B illustrate the use of strips 52 of electrically conducting material, mounted on a non-conducting backing 54, for example plastic, to form a probe strip 37. The strips 52 are provided with leads 56 as shown particularly in FIG. 9A which extend to a cable 58 analogous to leads 22. Apart from this the use is as shown in FIG. 1. Probe strip 37 is used in place of individual contact probes 16 and each strip 52 is equivalent to a probe 16.

FIGS. 10, 10A and 10B illustrate the application of the probe strip 37 to an arcuate tube, either on the bottom of the tube as shown in FIG. 10, the top as shown in 10A or on the side as shown in 10B. In each case, common probe 17 is also used in conjunction with probe strip 37.

Although the illustrated embodiments show two arcuate tubes 12 mounted within the body 10 it is possible to use a single tube 12 to use the body in association with a straight edge able to move to two positions, at right angles to each other. Thus when the straight edge contacts the base of the body the device is useful in assessing the horizontal level. When the straight edge is rotated through 90°, that is in contact with a flat end of the body, then the device is useful in assessing a vertical surface. Of course the position of the body and the arcuate tube within the body, is not altered.

Figure 11:
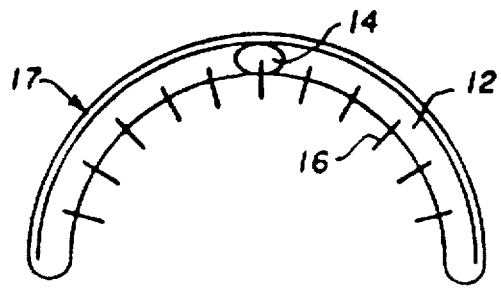
FIGS. 11, 11A and 11B illustrate a variation of the invention.
Figure 11A:
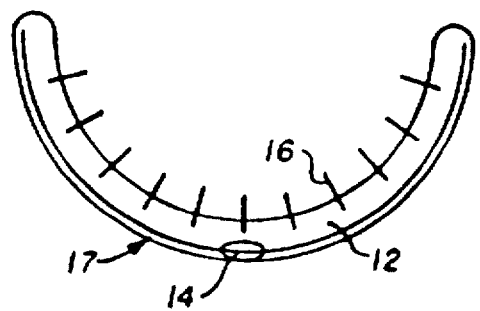

FIGS. 11 and 11A show a semi-circular sensor again comprising a tube 12 with probes 16 and common probe 17. The two tubes are used in combination. An upright sensor, shown in FIG. 11, gives 180° of angle before the reverse sensor, shown in FIG. 11A, comes into effect to show the rest of 360°.

Figure 11B:
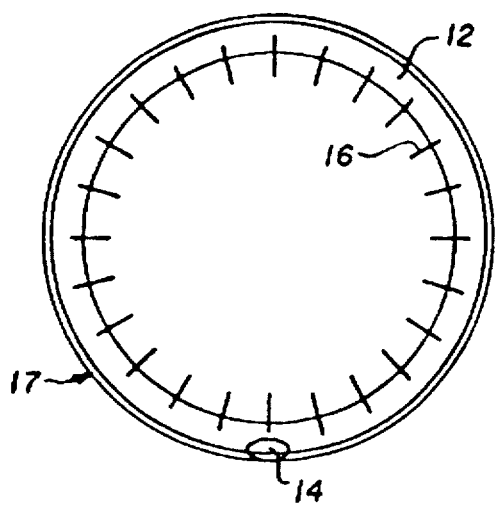

FIG. 11B shows a full circle sensor that will give 360° of angle. In FIGS. 11, 11A and 11B only the details of the tubes 12 are shown. The additional structure of conducting wires 18 and the like are not shown for purposes of clarity.

Figure 12:
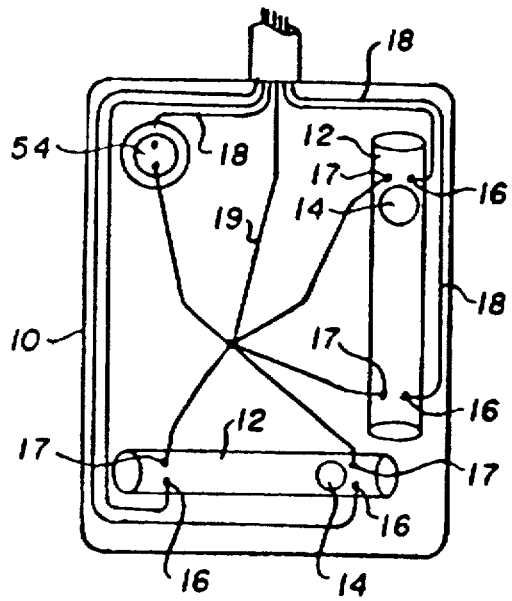
FIGS. 12 and 12A illustrate a tilting embodiment of the invention.
Figure 12A:
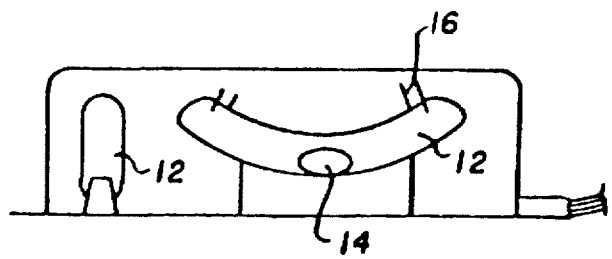

FIGS. 12 and 12A illustrate a device that can be used as a joy-stick, mouse or remote control, for example, toy cars, aeroplanes and equipment. However, in the case of the mouse it is not necessary to roll the mouse but merely to tip it. Similarly, a joy-stick or remote control does not include the actual stick, which must be moved, but can be operated simply by tilting the body. In the embodiment of FIGS. 12 and 12A the body 10 is held in the hand or a miniature device for the finger can be mounted on the body of the disabled and simply tipped. As the body is tipped the conductor within the tube 12 moves to make the contacts. There are two tubes 12, each at right angles to each other as shown particularly in FIG. 12. FIG. 12 also shows the conventional trigger button 54 or a trigger that can plug into a jack that is attached to the trigger wires to enable a remote, soft trigger to be used, for example by the disabled. For example it may be positioned in the mouth or operated by light pressure of the fingers or the body that is pressed to signal computer software that an action is to be performed. For example it may be used to operate as a trigger in games that involve shooting or mouse clicker.

FIGS. 13 through 16 illustrate variations of the apparatus of FIGS. 12 and 12A. Where appropriate, common reference numerals are used and the equipment of FIGS. 13 to 16 differs from that of FIGS. 12 and 12A mainly by the incorporation of a tube 112 that is not arcuate but is formed with a central bulb 114. This bulb 114 allows better control of the liquid of the first conductor when the device is tilted quickly. The curved tube 12, as illustrated particularly in FIG. 12A, together with the inertia of the conducting liquid, will sometimes allow the conducting liquid 14 to strike the other side of the tube, which is undesirable. This is especially so when the tube is tilted quickly in one direction then the other, whether it be the front or the back, or to one side. As the device of FIG. 12A is tilted, one tube 112 tilts longitudinally. The other tube, in effect, flatters, that is the mercury is lying on a flat surface with an arcuate shape of the tube in a horizontal plane. This means that the arcuate tilted tube will not hold the mercury in the centre. When the device of FIG. 12a is tilted back the side to side back arcuate tube will allow the mercury to roll on either side if tilted too far back.

In addition, the tube of FIGS. 13 to 16 allows inversion of the sensing device which will continue to work adequately although in a reverse direction as far as lateral tilting is concerned.

Figure 14:
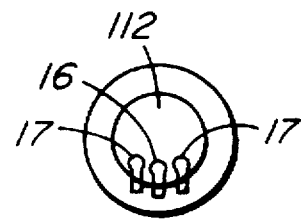
FIG. 14 is a detail of a preferred embodiment of the invention.
Figure 13A:
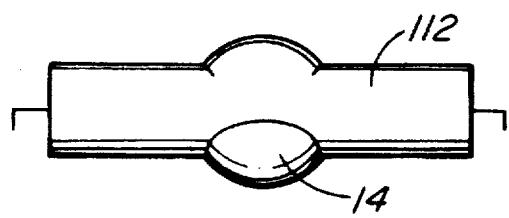
FIG. 13A is a detail view of the embodiment of FIG. 13.
Figure 15:
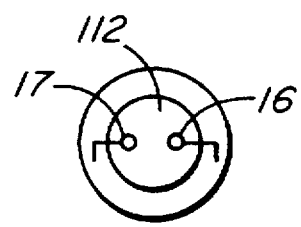
FIG. 15 is an alternative embodiment to that shown in FIG. 14.
Figure 16:
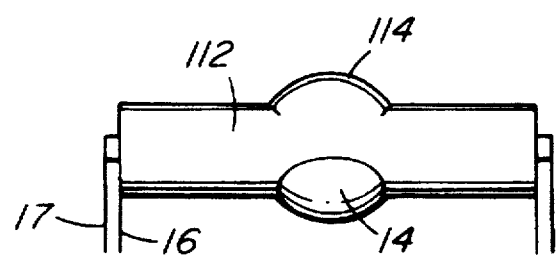
FIG. 16 is detail of the tube shown in FIG. 13A.

In addition to the different shape of the tube 12, FIGS. 14, 15, and 16, in particular, show the arrangement of different spaced contacts or probes 16 and the use of two probes 17, but on the ends of the tube, and flush with the inside as shown particularly in FIG. 16. Use of three or more probes provides more coverage. Three probes are shown in FIG. 14 but it may be desirable to use more.

Figure 17:
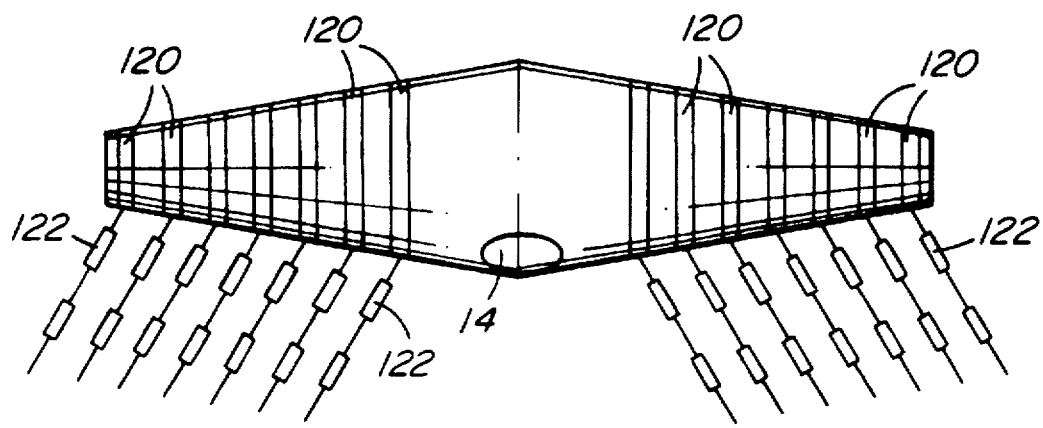
FIG. 17 is a side elevation of a further tube useful in the apparatus of the present invention.

FIG. 17 shows a variable speed sensor for a level, mouse, joy-stick or remote control. This embodiment of the invention shows a plurality of circumferential pairs of rings 120. Each pair of rings is in electrical contact with resistors 122. Of each pair of rings, one is a common contact ring, all of which common contact rings are linked together and attached to a power source. The other ring of the pair is the individual contact to which the resistors 122 are attached. There is an area at the centre of the tube free of pairs of rings 120. Thus when the device is level, the mercury 14 is at the bottom centre of the tube, the position shown in FIG. 17, and is neutral. As the mercury flows from the centre towards an end of the tube, it comes in contact with the paired contact rings 120. The first pair of rings, closer to the centre of the tube are in series with relatively high resistors 122 and as the mercury 14 moves toward the end of the tube the resistors 122 diminish. A computer interprets high resistance as low speed or power and low resistance as high speed or power. Therefore, as the tilt increases the speed or power is also increased. The paired rings 120 can be placed on strips in a cone-like configuration, one on each half. This allows a simpler construction.

Figure 18:
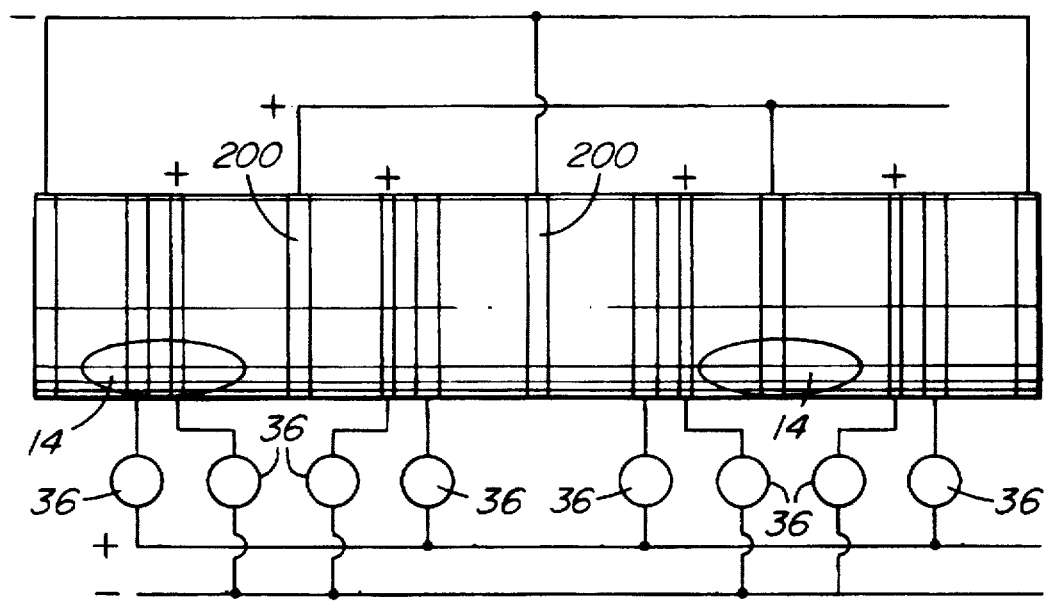
FIG. 18 is a schematic of an alternating sensor.

FIG. 18 shows an alternating sensor that uses rings 200. This means that the sensor uses both positive and the negative power and alternates them, allowing for twice the sensing points and thus twice the accuracy. The mercury 14 only has to move half the distance, thus increasing sensitivity by allowing a larger scale. With other embodiments the length of the mercury determines the number of LEDs illuminated but now the alternating of positive and negative means that the two contact probes 16, positive and negative, can come into contact with the mercury at the same time and only one circuit will be closed. At no time do power probes of opposite polarity come in contact with the mercury at the same time. When a power probe, for example a positive power probe, is in the middle of the mercury it will have one of its positive contact probes touching one end of the mercury and the other contact probe just out of touch of the mercury. This ensures that only one circuit will be closed and only one LED on. The negative contact probe can be touching at the same time and will not make any difference. If this sensor is attached to LEDs then the plus and negative contacts of the LEDs will have to alternate as the sensor probes do.

Figure 19:
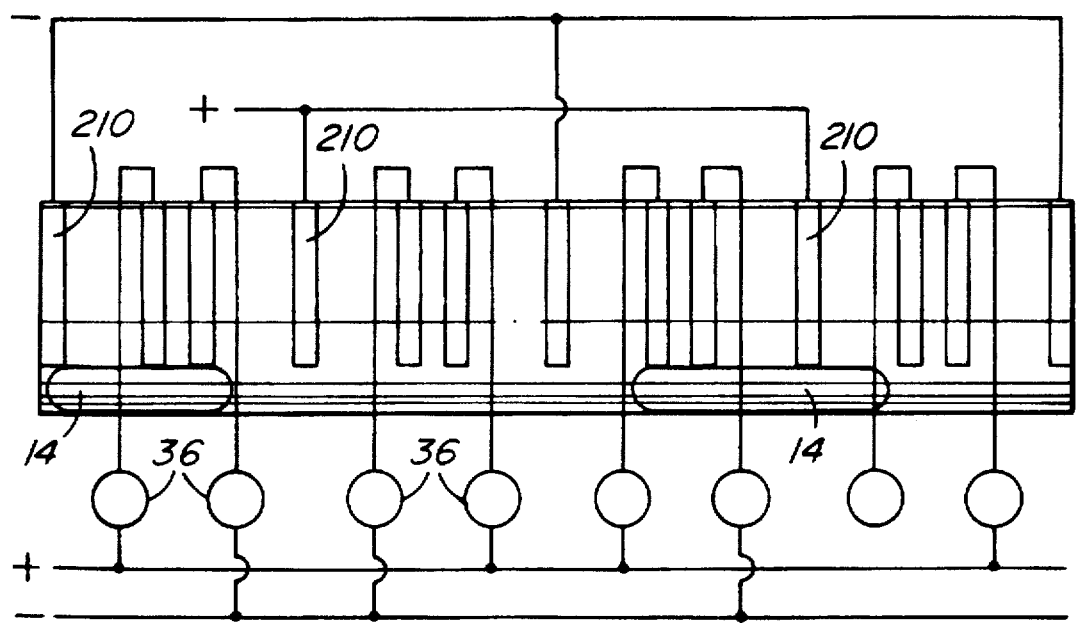
FIG. 19 is a schematic of a further alternating sensor, similar to that shown in FIG. 18.

FIG. 19 shows the same arrangement as FIG. 18 with alternating poles. But instead of ring probes 200 the embodiment of FIG. 19 uses pin probes 210. In both FIGS. 18 and 19 two mercury globules are shown but this is merely to illustrate how the probes can alternate.

Figure 20:
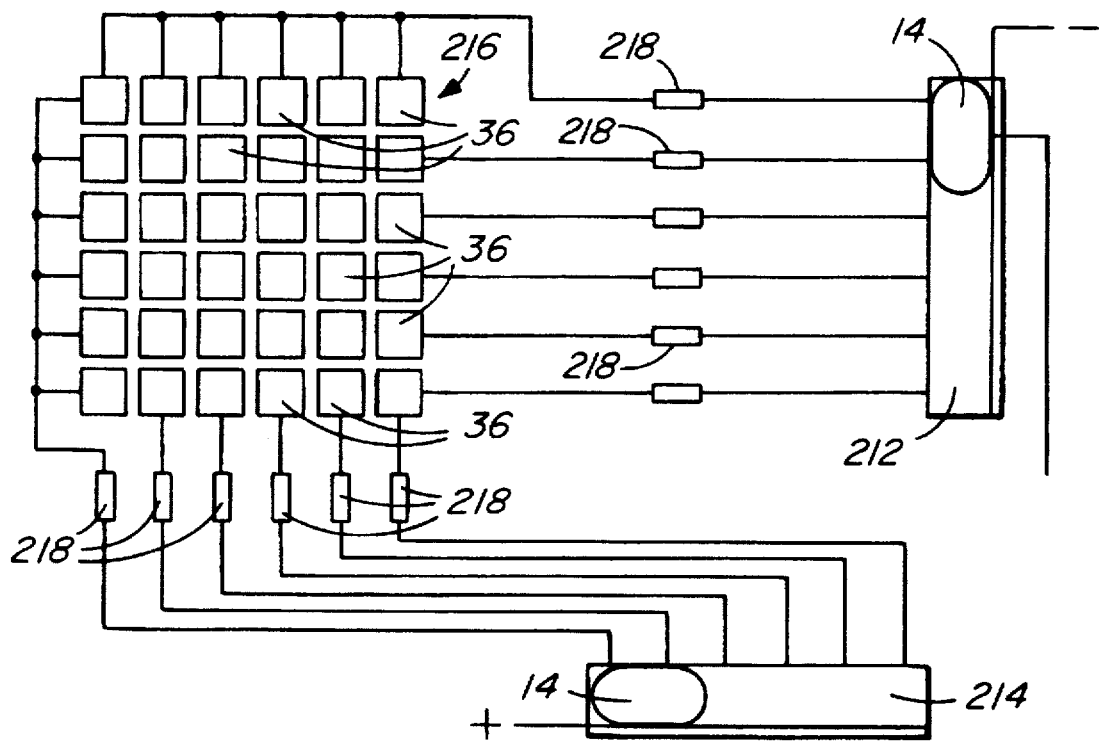
FIG. 20 shows a further type of sensor.

FIG. 20 shows a dual sensor in which one sensor 212 uses the negative pole and the other sensor 214 uses the positive pole. This allows the sensors to close one circuit at a time which accurately pinpoints the position of the mercury in a dual axis cluster of LEDs 216. For example if each sensor has six probes with resistors on wires 18, this will mean that the cluster 216 of LEDs will have six times six, that is thirty six, LEDs in a square. The one sensor 214 that is positive will be connected to the positive contact lead of the LEDs for the right and left or side sensors and if the LEDs are in a square then the far left probe of the positive sensor 214 will be connected to the positive leads of all the LEDs in far left column and the second far left probe will be attached to the positive leads of the LEDs in the second far left column and so on. For the negative sensor 212 which senses front and back tilt, front probe will be attached to the negative leads of the LEDs on the top row and so on. When the two spheres 14 of mercury move they work in unison with each other. One sensor revise the negative power to the negative leads of the LEDs and the other sensor revise the positive power to the positive leads of the LEDs. For example, if the positive sensor 214 is tilted to the extreme left and the negative sensor 212 to the extreme forward or down position then the far left/top LED 36 will light and so on. This sensor can light LEDs 36 in a diagonal pattern. Resistors 218 are used to reduce the amount of power to that required by the LEDs.

Figure 21:
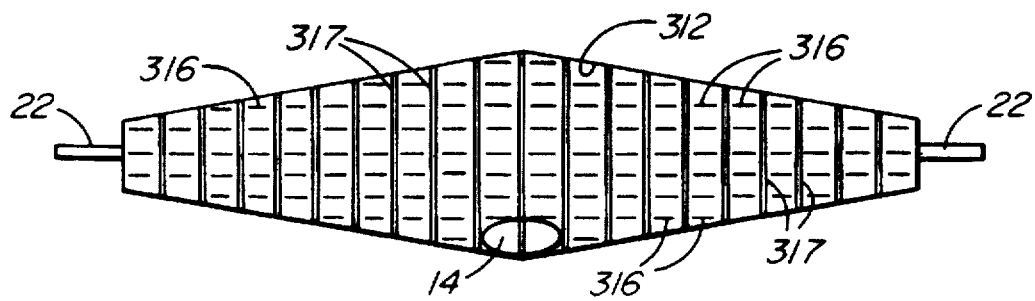
FIG. 21 shows what may be termed a coordinate sensor.

FIG. 21 shows a coordinate sensor that is of a dual conical shape, joined together with contact points throughout the sensor. The sensor can indicate exactly where the mercury is. The sensor can rotate 360° and with the proper computer interface or program it can give coordinates X, Y, plus, negative. The resistors can be used to give speed. The whole sensor tube has contacts through it. The probes can be a strip, for example two cones end to end.

In FIG. 21 common probes 317 are arranged throughout the tube 312. The details of the connections and the like are omitted for clarity. The spaced contacts 316 are shown horizontally in FIG. 21 with the common probes 317 arranged vertically. In a preferred embodiment of this aspect of the invention one coordinate sensor, the Y coordinates, will be on one side of the tube. As the tube 312 is rotated the probes move along the Y axis. For example if the sensor tube 312 is rotated towards the user it will go up the Y axis and if tilted away it will go down the Y axis which is a negative. If the sensor tube 312 shown in FIG. 21 is tilted to the left the mercury rolls into the negative X axis and to the right to the positive X axis. This sensor can take the place of two sensors as an input device, for example a mouse, joy-stick, remote control or level. Thus, only one sensor is needed.

Figure 13:
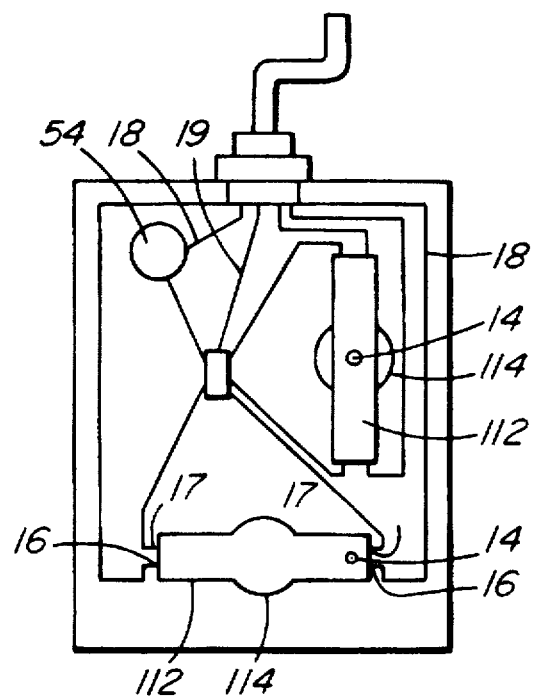
FIG. 13 is a plan view of a further embodiment of the invention, analogous to the embodiment of FIGS. 12 and 12A.

FIGS. 22a through 22e show a variation of the sensor of FIG. 13. The same reference numerals are used as in FIG. 13. However FIGS. 22a through 22e show a thumb wheel 400 attached to a third sensor tube 412 with this apparatus from the sensor unit tilted down the thumb sensor wheel can be tilted down or up independently by the thumb wheel being rolled. In this way a three dimensional effect is achieved. The third sensor 412 is the Z axis that is controlled by the thumb wheel 400.

Figure 22A:
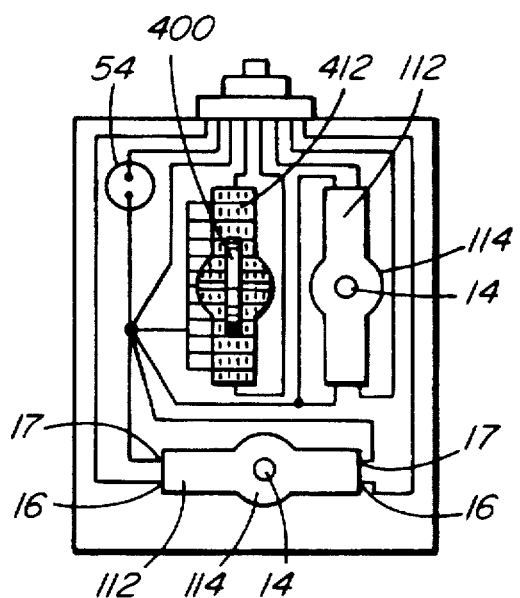
FIGS. 22a through 22e illustrate a further embodiment to the invention.
Figure 22B:
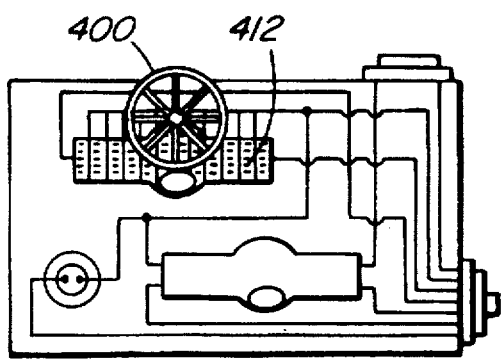
Figure 22C:
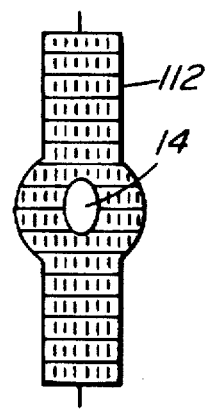
Figure 22D:
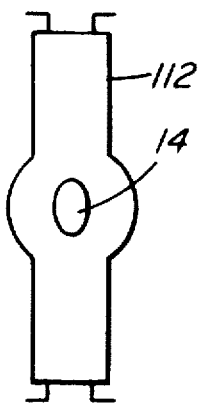
Figure 22E:
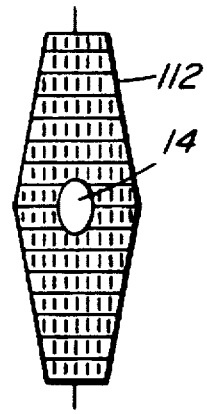

It should be pointed out that any sensor can be used for the three dimensional application. The three dimensional application can also be used for remote controls. FIGS. 22c through 22e show different sensors. In FIG. 22c the coordinate bubble sensor is shown. In FIG. 22d the bubble sensor is shown and in FIG. 22e the conical coordinate sensor is shown.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

I claim:

1. A computer input device comprising:
   a body containing a tube comprising opposed cones, joined at the cone bases;
   a first conductor in the tube able to move along the tube;
   a plurality of spaced contacts within the tube;
   conductors extending from the spaced contacts;
   first interface means to receive information from said conductors as to the position of the first conductor in the tube and input information to the computer based on the position of the first conductor; and
   second interface means to input information to the computer.

2. A computer input device as claimed in claim 1, including at least one depressible switch to input information to the computer.

3. A computer input device as claimed in claim 1, in which the first conductor is mercury.

4. A computer input device as claimed in claim 1 in which the contacts are strips arranged circumferentially within said tube.

5. A computer input device as claimed in claim 4 further comprising a plurality of discrete contacts, generally perpendicular to said circumferential strips throughout the tube.

6. A computer input device as claimed in claim 1 in which the contacts are probes arranged to extend into said tube.

7. A computer input device as claimed in claim 1 including resistors in the conductors.

* * * * *